United States Patent
Hsu et al.

(10) Patent No.: US 10,620,501 B2
(45) Date of Patent: Apr. 14, 2020

(54) ACTIVE MATRIX SUBSTRATE, METHOD FOR PRODUCING ACTIVE MATRIX SUBSTRATE, AND LIQUID CRYSTAL DISPLAY DEVICE

(71) Applicant: Sharp Kabushiki Kaisha, Sakai, Osaka (JP)

(72) Inventors: Chia-Hui Hsu, Sakai (JP); Junichi Morinaga, Sakai (JP); Katsuya Ogawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/218,605

(22) Filed: Dec. 13, 2018

(65) Prior Publication Data

US 2019/0196286 A1    Jun. 27, 2019

(30) Foreign Application Priority Data

Dec. 27, 2017  (JP) .................................. 2017-252204

(51) Int. Cl.
*G02F 1/1362* (2006.01)
(52) U.S. Cl.
CPC .. *G02F 1/136286* (2013.01); *G02F 1/136213* (2013.01); *G02F 1/136227* (2013.01); *G02F 2201/123* (2013.01); *G02F 2201/40* (2013.01)
(58) Field of Classification Search
CPC ................................................ G02F 1/136213
See application file for complete search history.

(56) References Cited

U.S. PATENT DOCUMENTS

| 6,052,162 | A   | * | 4/2000 | Shimada  | G02F 1/136227 349/38 |
|-----------|-----|---|--------|----------|----------------------|
| 2008/0068524 | A1 | * | 3/2008 | Kim      | G02F 1/136286 349/38 |
| 2008/0143664 | A1 | * | 6/2008 | Nakagawa | G02F 1/136286 345/92 |
| 2011/0019114 | A1 | * | 1/2011 | Tsubata  | G02F 1/13624 349/38  |
| 2016/0005770 | A1 | * | 1/2016 | Inoue    | H01L 27/1288 257/43  |
| 2018/0157080 | A1 | * | 6/2018 | Um       | G02F 1/13624         |

FOREIGN PATENT DOCUMENTS

| JP | 2002-189232 A | 7/2002 |
| JP | 2016-18036 A  | 2/2016 |

* cited by examiner

*Primary Examiner* — Sang V Nguyen
(74) *Attorney, Agent, or Firm* — Keating & Bennett, LLP

(57) ABSTRACT

The present invention provides a technology which allows ensuring a high level of reliability and achieving a high aperture ratio. An active matrix substrate includes: a drain electrode extension section connected to a drain electrode of a switching element and made of an oxide semiconductor which has been made conductive; and a storage capacitor electrode overlapping with at least a portion of the drain electrode extension section, at least a portion of the storage capacitor electrode being light-transmissive.

8 Claims, 5 Drawing Sheets

ACTIVE MATRIX SUBSTRATE, METHOD FOR PRODUCING ACTIVE MATRIX SUBSTRATE, AND LIQUID CRYSTAL DISPLAY DEVICE

This Nonprovisional application claims priority under 35 U.S.C. § 119 on Patent Application No. 2017-252204 filed in Japan on Dec. 27, 2017, the entire contents of which are hereby incorporated by reference.

TECHNICAL FIELD

The present invention relates to an active matrix substrate, a method for producing the active matrix substrate, and a liquid crystal display device.

BACKGROUND ART

In recent years, a liquid crystal display device, which is an example of display devices, has become more advanced in function, and levels of properties that are expected of the liquid crystal display device are increasingly becoming high. The properties which the liquid crystal display device is expected to possess are, for example, high luminance, high resolution, reduced thickness and weight, lower power consumption, and the like.

For example, Patent Literature 1 discloses a technology in which (i) in order to increase an aperture ratio of a liquid crystal display device, a pixel electrode is arranged to overlap with various wires and (ii) a film having a high transmittance is used as an interlayer insulating film so as to enable effective use of light from a backlight. Specifically, the liquid crystal display device includes: switching elements, gate wires, and source wires; an interlayer insulating film provided over the switching elements, the gate wires, and the source wires; pixel electrodes which are provided on the interlayer insulating film; and an electrode which connects each of the pixel electrodes and a drain to each other over a gate wire or an additional capacitance wire through a contact hole which penetrates through the interlayer insulating film.

Meanwhile, Patent Literature 2 discloses a technology for providing an active matrix substrate having excellent electric characteristics. The technology allows an oxide semiconductor film to be easily used as a semiconductor channel film of a TFT (thin-film transistor) as well as reducing the number of steps of a photoengraving (production) process. Specifically, the active matrix substrate is configured such that: a plurality of pixels are arranged in matrix; each of the plurality of pixels includes a gate electrode, a common electrode, a gate insulating film, an oxide transparent film, a source electrode, a drain electrode, and a pixel electrode; the oxide transparent film has a conductor region and a semiconductor region; the conductor region is provided (i) below the source electrode and the drain electrode and (ii) in a portion which is connected to a lower part of the drain electrode and extends to above a part of the common electrode so as to constitute the pixel electrode; the semiconductor region is provided in a portion which corresponds to a lower layer of a region between the source electrode and the drain electrode so as to constitute a channel region of the thin-film transistor; and the source electrode and the drain electrode are electrically connected to the conductor region of the oxide transparent film.

CITATION LIST

Patent Literature

[Patent Literature 1]
 Japanese Patent Application Publication, Tokukai, No. 2002-189232 A (Publication Date: Jul. 5, 2002)

[Patent Literature 2]
 Japanese Patent Application Publication, Tokukai, No. 2016-18036 A (Publication Date: Feb. 1, 2016)

SUMMARY OF INVENTION

Technical Problem

However, the technologies disclosed in Patent Literatures 1 and 2 still have room for improvement in terms of achieving a high aperture ratio while ensuring a high level of reliability.

Solution to Problem

In order to attain the object, an active matrix substrate in accordance with one aspect of the present invention is an active matrix substrate including: a plurality of pixels arranged in matrix; a plurality of gate wires; a plurality of source wires intersecting with the plurality of gate wires; a switching element including (i) a gate electrode connected to a corresponding one of the plurality of gate wires and (ii) a source electrode connected to a corresponding one of the plurality of source wires; a drain electrode extension section connected to a drain electrode of the switching element, the drain electrode extension section being made of an oxide semiconductor which has been made conductive; and a storage capacitor electrode overlapping with at least a portion of the drain electrode extension section, at least a portion of the storage capacitor electrode being light-transmissive.

In order to attain the object, a method, in accordance with another aspect of the present invention, for producing an active matrix substrate is a method for producing an active matrix substrate, including: a first step of forming a storage capacitor electrode layer; a second step of forming a gate insulating film layer on the storage capacitor electrode layer so that the gate insulating film layer covers the storage capacitor electrode layer; and a third step of forming a drain electrode extension section layer on the gate insulating film layer so that the drain electrode extension section layer overlaps with at least a portion of the storage capacitor electrode layer, the drain electrode extension section layer being made of an oxide semiconductor which has been made conductive, at least a portion of the storage capacitor electrode layer being light-transmissive.

In order to attain the object, a liquid crystal display device in accordance with still another aspect of the present invention is a liquid crystal display device including the above active matrix substrate.

Advantageous Effects of Invention

According to one aspect of the present invention, it is possible to provide a liquid crystal display device which enables both ensuring a high level of reliability and achieving a high aperture ratio.

DESCRIPTION OF EMBODIMENTS

Embodiment 1

Figure 1:
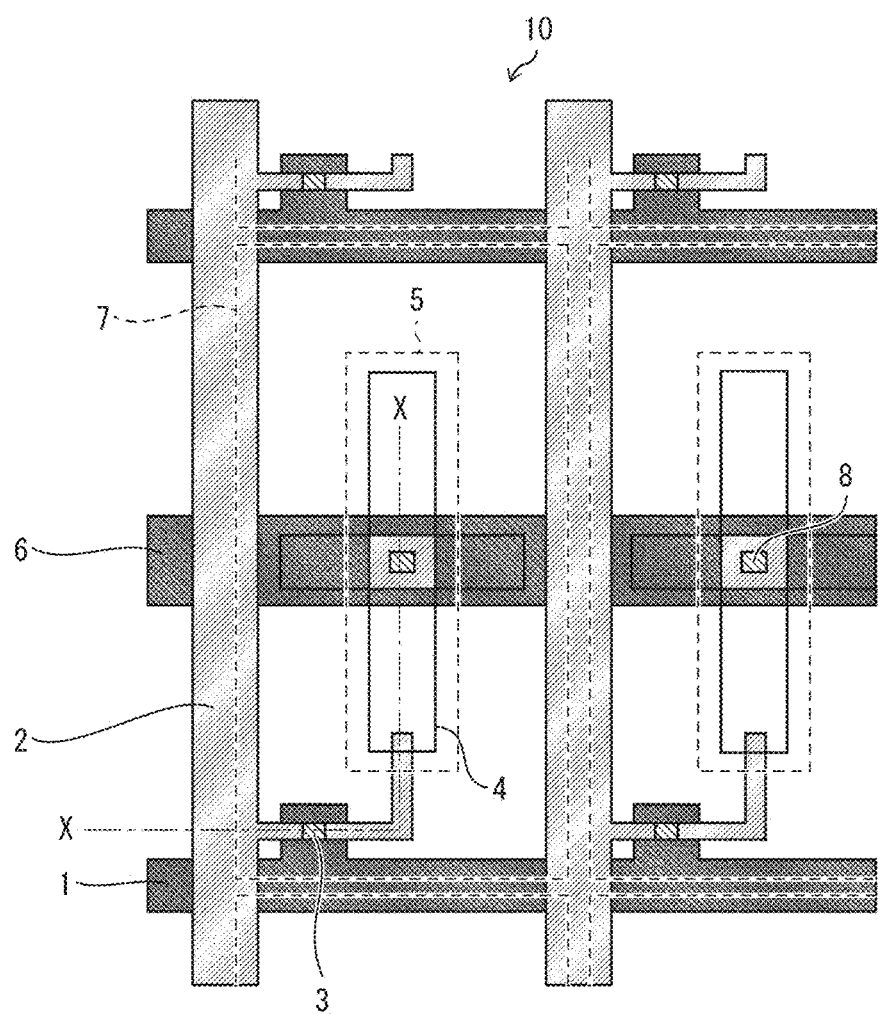
FIG. 1 is a view illustrating a configuration of an active matrix substrate in accordance with Embodiment 1 of the present invention.
Figure 2:
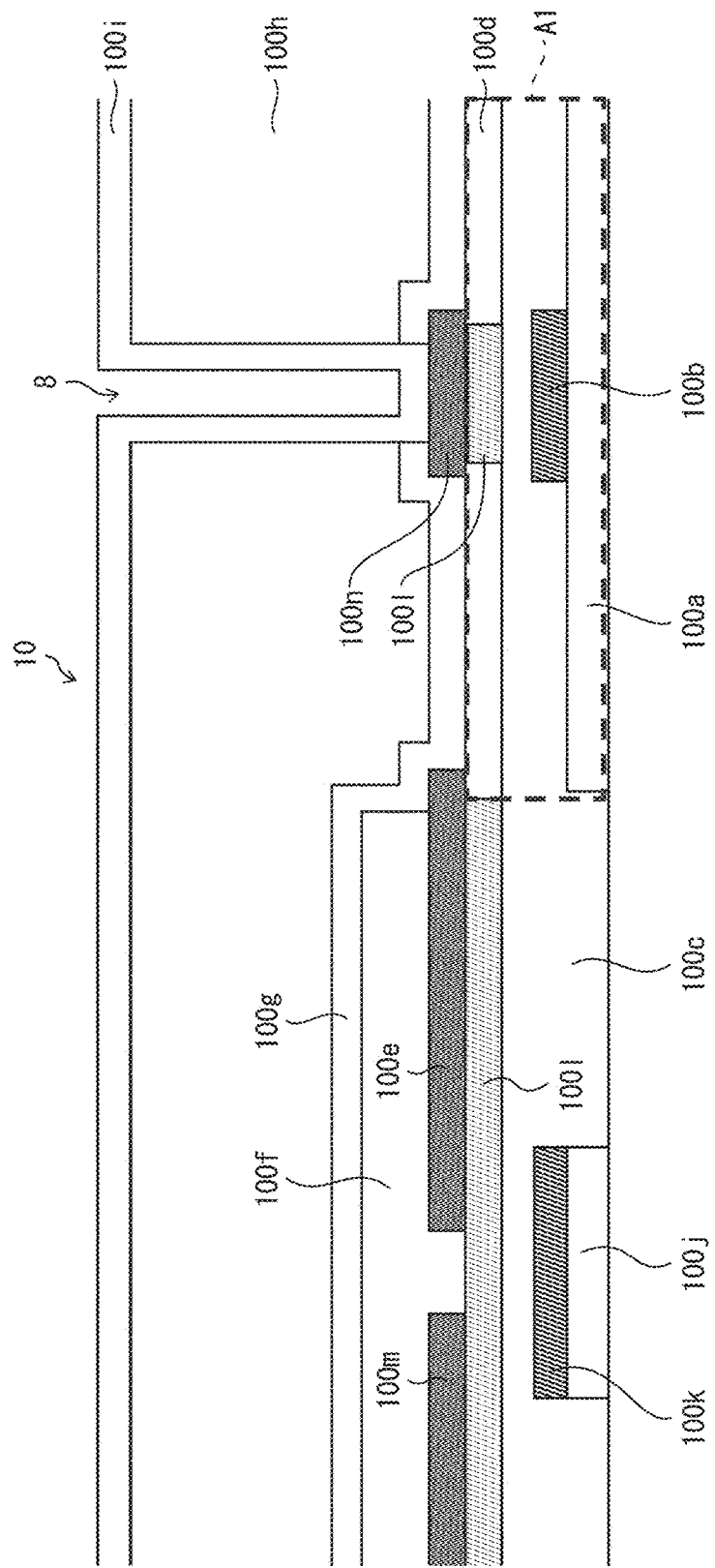
FIG. 2 is a cross-sectional view of main parts of FIG. 1, taken along a line X-X in FIG. 1.

The following description will discuss Embodiment 1 with reference to FIGS. 1 and 2.

Hereinafter, an aperture ratio refers to a ratio of a light-transmitting region to a total area of the light-transmitting region and a light-blocking region in a display region in a case where an active matrix substrate is applied to a liquid crystal display device.

<Configuration of Active Matrix Substrate>

FIG. 1 is a view illustrating a configuration of an active matrix substrate 10 in accordance with Embodiment 1. The active matrix substrate 10 is used, for example, for a liquid crystal display device, which is an example of a display device in accordance with Embodiment 1. As illustrated in FIG. 1, the active matrix substrate 10 includes a plurality of pixels which are arranged in matrix. The active matrix substrate 10 includes a plurality of gate wires 1, a plurality of source wires 2, a switching element 3, a drain electrode extension section 4, and a storage capacitor electrode 5.

Specifically, each of the plurality of gate wires 1 supplies a scanning signal to a gate electrode so as to drive a corresponding one of the plurality of pixels. In Embodiment 1, each gate wire 1 is disposed on a lower one of the sides that constitute a pixel.

The plurality of source wires 2 are arranged so as to intersect with the plurality of gate wires 1. Each source wire supplies a display signal (data signal) to a source electrode.

The switching element 3 includes (i) the gate electrode, which is connected to a corresponding gate wire 1 and (ii) the source electrode, which is connected to a corresponding source wire 2. The switching element 3 can, for example, be made of a thin-film transistor (TFT), but the present invention is not limited to this.

The drain electrode extension section 4 is connected to a drain electrode of the switching element 3, and is made of an oxide semiconductor which has been made conductive. The drain electrode is connected to an electrode for forming a storage capacitor.

The storage capacitor electrode 5 overlaps with at least a portion of the drain electrode extension section 4, and at least a portion of the storage capacitor electrode 5 is light-transmissive.

The active matrix substrate 10 further includes a storage capacitor wire (also referred to as a storage capacitor bus line or a CS bus line) 6 and a pixel electrode section 7. Further, as described later, the active matrix substrate 10 may have a contact hole 8 formed therein.

The storage capacitor electrode 5 is connected to the storage capacitor wire 6 which is disposed at a center of the pixel. Each source wire 2 overlaps with the pixel electrode section 7.

Note that, as illustrated in FIG. 1, each of the drain electrode extension section 4 and the storage capacitor electrode 5 in accordance with Embodiment 1 extends in a long-rectangular shape in a direction (longitudinal direction) along which each source wire 2 extends. Further, the drain electrode extension section 4 and the storage capacitor electrode 5 extend across the storage capacitor wire 6, as illustrated in FIG. 1.

Figure 5:
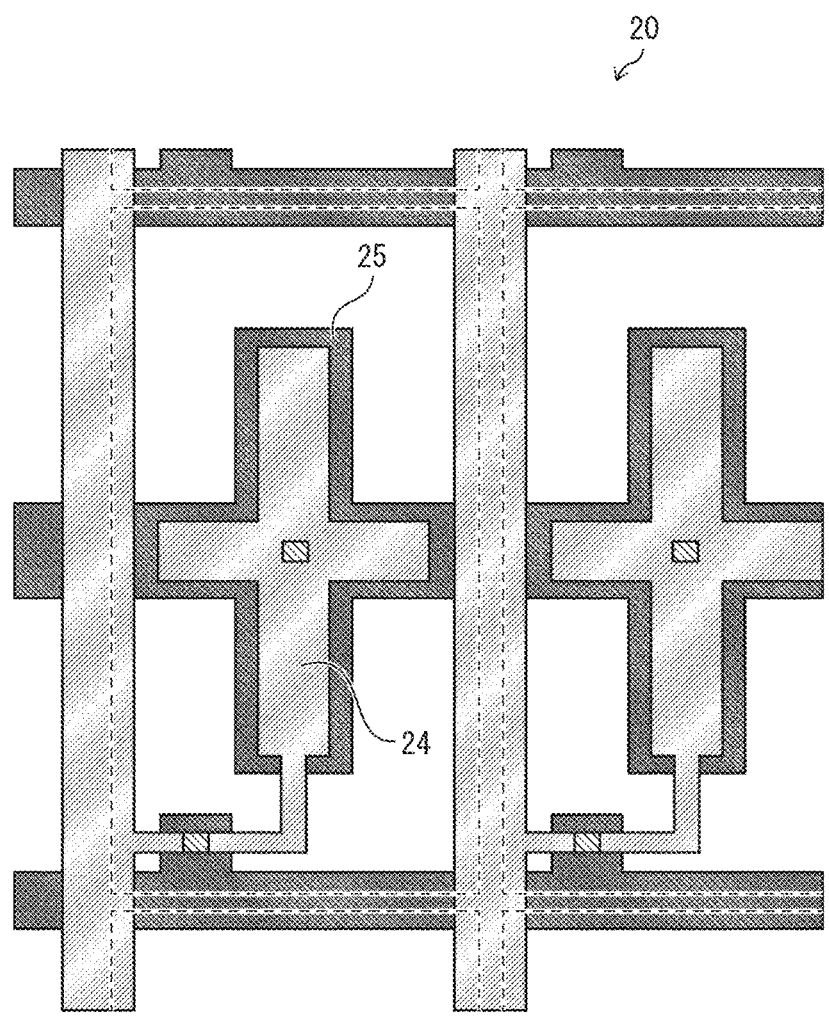
FIG. 5 is a view illustrating a configuration of a substrate in accordance with Comparative Example.

For comparison, the following description will discuss Comparative Example with reference to FIG. 5. For easy explanation, the following description will focus on differences between Comparative Example and Embodiment 1. As for configurations which are the same as those in Embodiment 1, reference signs and descriptions will be omitted.

FIG. 5 is a view illustrating a configuration of a substrate 20 in accordance with Comparative Example. As illustrated in FIG. 5, the substrate 20 includes a drain electrode 24 and a CS electrode 25, each of which is made of a light-blocking material. Specifically, in Comparative Example, the drain electrode 24 is made of a source metal and the CS electrode 25 is made of a gate metal.

In Embodiment 1, the drain electrode extension section 4 which is connected to the drain electrode of the switching element 3 is made of an oxide semiconductor which has been made conductive, and at least a portion of the storage capacitor electrode 5, which overlaps with at least a portion of the drain electrode extension section 4, is light-transmissive. Accordingly, Embodiment 1 allows providing the active matrix substrate 10 which enables both securing a high level of reliability and achieving a high aperture ratio.

Further, in contrast to Comparative Example, Embodiment 1 allows designing the storage capacitor wire 6, which is made of a light-blocking metal, to have a shape with a minimum width, without being given restriction on storage capacitance. This allows increasing a degree of freedom in designing the active matrix substrate 10 without causing deterioration in properties of the active matrix substrate 10.

Note that the storage capacitor electrode 5 is preferably made of a transparent conductive film (e.g., ITO ($In_2O_3$/$SnO_2$), IZO ($In_2O_3$/ZnO), or the like). The drain electrode extension section 4 is preferably made of an oxide semiconductor (InGaZnO) which has been made conductive. This configuration allows further ensuring an effect brought about by Embodiment 1.

The following description will further discuss Embodiment 1 with reference to FIG. 2. For easy explanation, the description will only focus on configurations related to the present invention.

FIG. 2 is a cross-sectional view of main parts of FIG. 1, taken along a line X-X in FIG. 1.

<General Description of Cross-Sectional Configuration>

As illustrated in FIG. 2, the active matrix substrate 10 includes, for example, the following members in the following order in a bottom-to-top direction of the drawing sheet of FIG. 2, which is an order of production steps of the members. That is, the active matrix substrate 10 includes, for example, (i) conductive film layers 100a and 100j, (ii) an electrode layer 100b and an electrode layer 100k, (iii) a first insulating film layer 100c covering the conductive film layers 100a and 100j and the electrode layers 100b and 100k, (iv) an oxide semiconductor layer 100d which has been made conductive and an oxide semiconductor layer 100l, (v) a drain wire layer 100e, a source layer 100m, and an electrode layer 100n, (vi) a second insulating layer 100f covering the drain wire layer 100e and the source layer 100m, (vii) a third insulating layer 100g which not only covers the second insulating layer 100f but also penetrates through the second insulating layer so as to cover the oxide semiconductor layer 100d, (viii) a fourth insulating layer 100h, and (ix) a pixel electrode layer 100i.

Further, as illustrated in FIG. 2, the pixel electrode layer 100*i* of the active matrix substrate 10 has the contact hole 8, at which the pixel electrode layer 100*i* penetrates through the fourth, third, and second insulating layers so as to connect to the electrode layer 100*n*.

Further, in Embodiment 1, in a portion A1 indicated by a broken line in a lower right portion of FIG. 2, the conductive film layer 100*a*, which extends so as to include the electrode layer 100*b*, and the oxide semiconductor layer 100*d*, which has been made conductive, form a storage capacitor section in such a manner that a portion of the first insulating film layer 100*c* is interposed between the conductive film layer 100*a* and the oxide semiconductor layer 100*d*. The conductive film layer 100*a* and the oxide semiconductor layer 100*d* which has been made conductive correspond to the storage capacitor electrode 5 and the drain electrode extension section 4, respectively, of Embodiment 1.

As described above, according to the above configuration of Embodiment 1, (i) the drain electrode extension section 4, which is connected to the drain electrode of the switching element 3, is made of an oxide semiconductor which has been made conductive and (ii) at least a portion of the storage capacitor electrode 5, which overlaps with at least a portion of the drain electrode extension section 4, is light-transmissive. Accordingly Embodiment 1 allows providing the active matrix substrate 10 which enables both ensuring a high level of reliability and achieving a high aperture ratio.

<Method for Producing Active Matrix Substrate>

The following description will discuss a method for producing the active matrix substrate 10. For example, the following production steps are automatically carried out by a production apparatus in accordance with Embodiment 1.

—First Production Step

An ITO layer is formed. A portion of the ITO layer thus formed serves as a CS electrode 100*a*, as illustrated in FIG. 2.

—Second Production Step

A gate electrode 100*k* and the electrode layer 100*b* are formed.

—Third Production Step

The first insulating film layer 100*c* is formed so as to cover the gate electrode 100*k*, the CS electrode 100*a*, and the electrode layer 100*b*, and the oxide semiconductor layers 100*d* and 100*l* are further formed on the first insulating film layer 100*c*.

—Fourth Production Step

A source electrode 100*m*, a drain electrode 100*e*, and the electrode layer 100*n* are formed.

—Fifth Production Step

The second insulating layer 100*f* is formed. After the formation of the second insulating layer 100*f*, (i) photo-etching is performed, (ii) the third insulating layer 100*g* is formed on the second insulating layer 100*f*, and (iii) the oxide semiconductor layer which is exposed in a region where the second insulating layer 100*f* has been etched is treated so as to become conductive.

—Sixth Production Step

The fourth insulating layer 100*h* is formed, and then photo-etching is carried out.

—Seventh Production Step

After the photo-etching in the above sixth step, an ITO layer is formed. At this time, the contact hole 8 is formed as a result of the photo-etching conducted in the sixth step.

As described above, in Embodiment 1, the method for producing the active matrix substrate includes at least (i) a first step (the first and second production steps above) of forming a storage capacitor electrode layer, (ii) a second step (the third production step above) of forming a gate insulating film layer on the storage capacitor electrode layer so as to cover the storage capacitor electrode layer, thus forming an oxide semiconductor layer, and (iii) a third step (the fifth production step above) of forming a drain electrode extension section layer on the gate insulating film layer so as to overlap with at least a portion of the storage capacitor electrode layer.

Note that each of the storage capacitor electrode and the storage capacitor electrode wire does not have to be in the same layer as the gate electrode, and may be made of a conductive material such as a transparent conductive film.

Specifically, the conductive film layer 100*a* is formed in the first step, the first insulating film layer 100*c* is formed in the second step, and the oxide semiconductor layer 100*d* is formed in the third step. The oxide semiconductor layer 100*d* serves as the drain electrode extension section layer, and the conductive film layer 100*a* serves as the storage capacitor electrode layer.

The drain electrode extension section layer is made of an oxide semiconductor which has been made conductive, and at least a portion of the storage capacitor electrode layer is light-transmissive.

The above-described production method makes it possible to produce the active matrix substrate 10 which is capable of exhibiting an effect of Embodiment 1.

Embodiment 2

Figure 3:
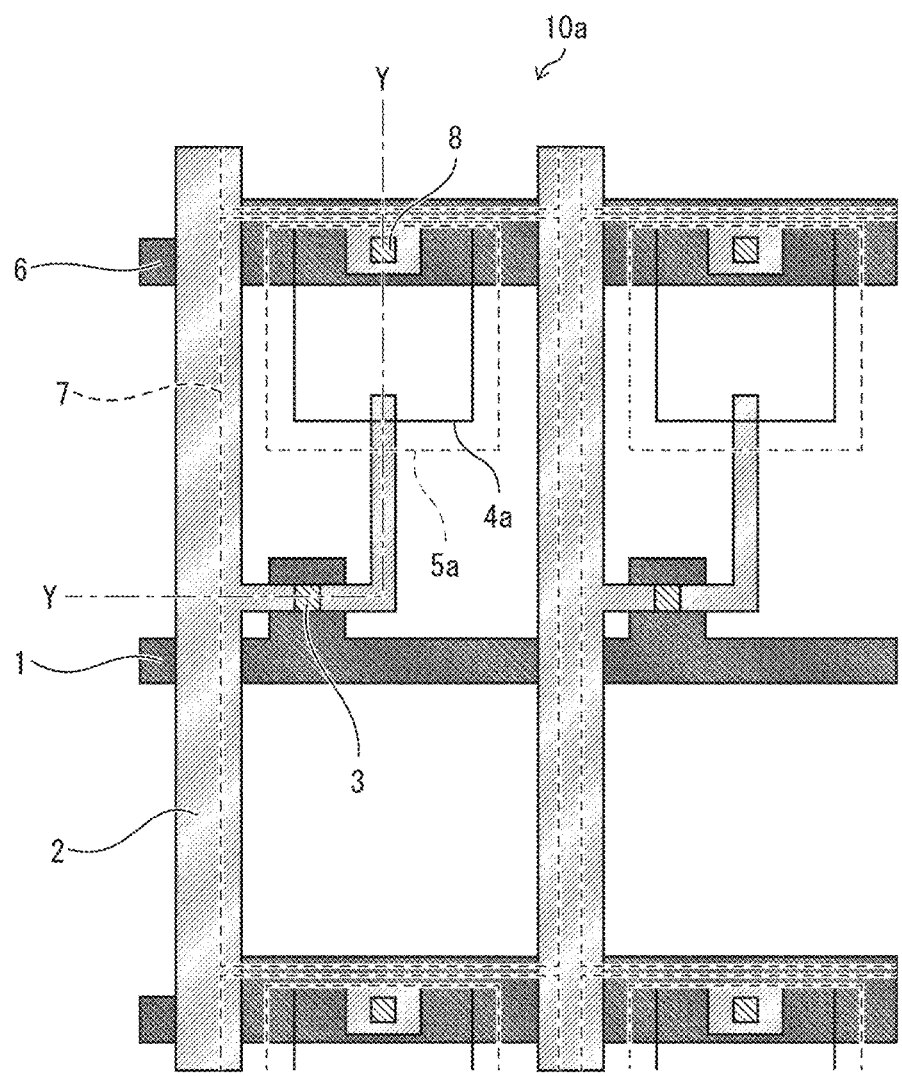
FIG. 3 is a view illustrating a configuration of an active matrix substrate in accordance with Embodiment 2 of the present invention.

The following description will discuss Embodiment 2 with reference to FIG. 3. For easy explanation, the same reference signs will be given to configurations each having the same function as a configuration described in Embodiment 1, and descriptions on such a configuration will be omitted.

Embodiment 2 differs from Embodiment 1 in positional arrangement of gate wires, shapes of an electrode extension section and a storage capacitor electrode, and how the electrode extension section and the storage capacitor electrode are disposed. The description below will particularly focus on these differences.

As illustrated in FIG. 3, an active matrix substrate 10*a* in accordance with Embodiment 2 is configured such that a gate wire 1 is disposed in a central section of each pixel, and a storage capacitor electrode 5*a* is connected to a storage capacitor wire 6 which is disposed between pixels that are adjacent to each other in a longitudinal direction.

Further, in Embodiment 2, a drain electrode extension section 4*a* is connected to a drain electrode of a switching element 3 and is made of an oxide semiconductor which has been made conductive. The storage capacitor electrode 5*a* overlaps with at least a portion of the drain electrode extension section 4*a*, and at least a portion of the storage capacitor electrode 5*a* is light-transmissive.

Note that, as illustrated in FIG. 3, each of the drain electrode extension section 4*a* and the storage capacitor electrode 5*a* in accordance with Embodiment 2 has a substantially square shape. Further, as illustrated in FIG. 3, the drain electrode extension section 4*a* and the storage capacitor electrode 5*a* are provided on one side with respect to the storage capacitor wire 6 (provided on a gate wire 1 side within each pixel).

As with Embodiment 1, the storage capacitor electrode 5*a* is preferably made of a transparent conductive film (ITO). The drain electrode extension section 4*a* is preferably made of an oxide semiconductor which has been made conductive.

Figure 4:
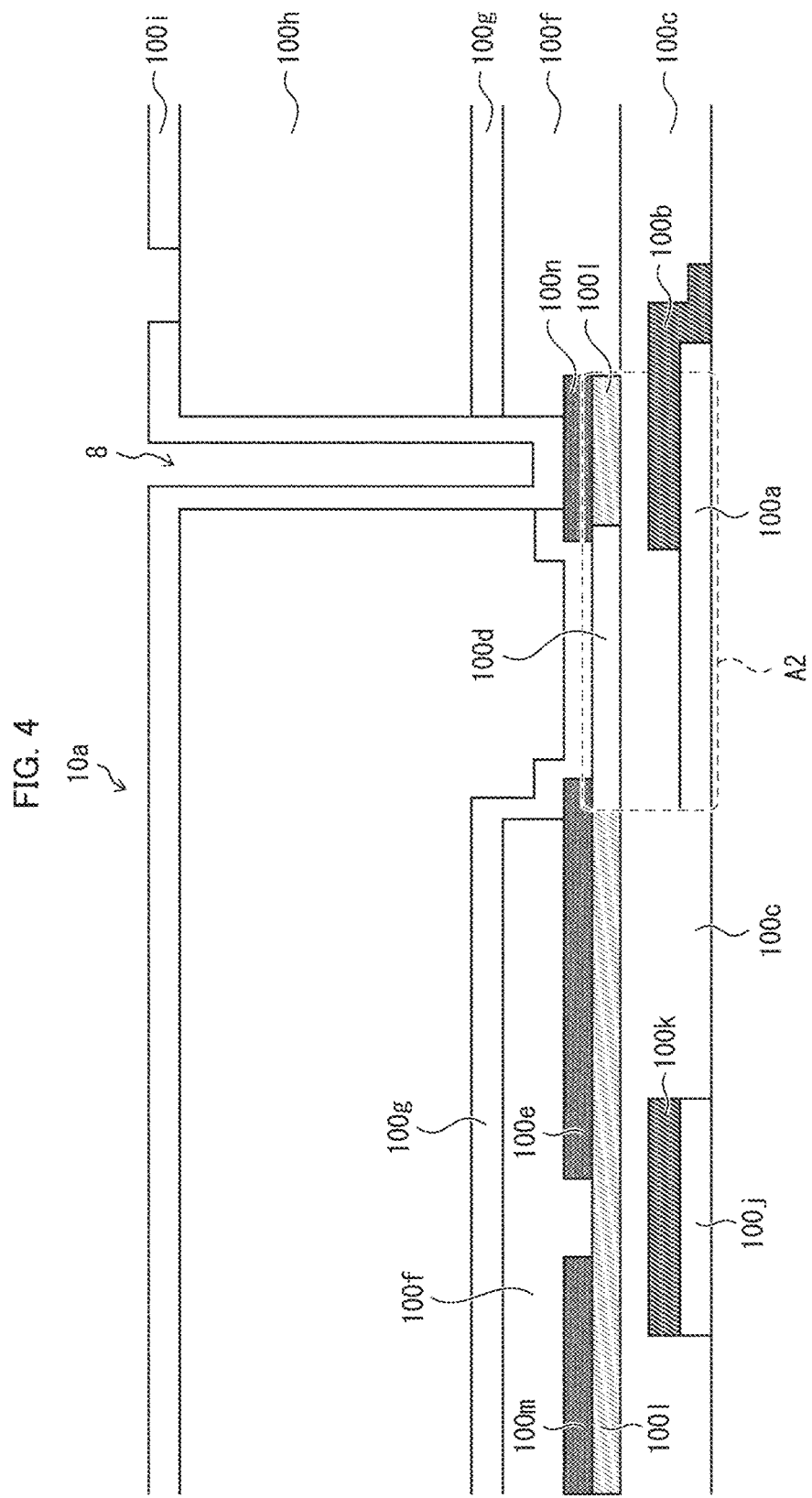
FIG. 4 is a cross-sectional view of main parts of FIG. 3, taken along a line Y-Y in FIG. 3.

FIG. 4 is a cross-sectional view illustrating main parts of FIG. 3, taken along a line Y-Y in FIG. 3. Layers similar to those of Embodiment 1 are each indicated with the same reference sign as that in Embodiment 1.

As illustrated in FIG. 4, an oxide semiconductor layer 100d, which has been made conductive and constitutes the drain electrode extension section 4a, and a conductive film layer 100a, which constitutes the storage capacitor electrode 5a, are provided on a gate electrode 100k side with respect to an electrode layer 100b which constitutes the storage capacitor wire 6.

In Embodiment 2, a portion A2 indicated by a broken line in a lower right portion of FIG. 4 is a storage capacitor section which contains a portion of the conductive film layer 100a, a portion of the electrode layer 100b, a portion of an insulating film layer 100c, and the oxide semiconductor layer 100d which has been made conductive.

The above configuration allows the same effects as those of Embodiment 1 to be exhibited.

[Recap]

An active matrix substrate (10, 10a) in accordance with Aspect 1 of the present invention is an active matrix substrate including: a plurality of pixels arranged in matrix; a plurality of gate wires (1); a plurality of source wires (2) intersecting with the plurality of gate wires; a switching element (3) including (i) a gate electrode connected to a corresponding one of the plurality of gate wires and (ii) a source electrode connected to a corresponding one of the plurality of source wires; a drain electrode extension section (4, 4a) connected to a drain electrode of the switching element, the drain electrode extension section being made of an oxide semiconductor which has been made conductive; and a storage capacitor electrode (5, 5a) overlapping with at least a portion of the drain electrode extension section, at least a portion of the storage capacitor electrode being light-transmissive.

The above configuration makes it possible to provide the active matrix substrate (10, 10a) which enables both securing a high level of reliability and achieving a high aperture ratio.

In Aspect 2 of the present invention, the active matrix substrate (10, 10a) in accordance with Aspect 1 above may be configured such that the storage capacitor electrode (5, 5a) is made of ITO.

The above configuration allows further ensuring an effect brought about by the present invention.

In Aspect 3 of the present invention, the active matrix substrate (10, 10a) in accordance with Aspect 1 or 2 above may be configured such that the drain electrode extension section (4, 4a) is made of an oxide semiconductor which has been made conductive.

The above configuration allows further ensuring an effect brought about by the present invention.

In Aspect 4 of the present invention, the active matrix substrate (10, 10a) in accordance with any one of Aspects 1 through 3 above is configured such that in each of the plurality of pixels, the storage capacitor electrode (5a) extends only toward a corresponding one of the plurality of gate wires (1) with respect to a storage capacitor wire (6) to which the storage capacitor electrode is connected.

A method, in accordance with Aspect 5 of the present invention, for producing an active matrix substrate (10, 10a) is a method for producing an active matrix substrate, including: a first step of forming a storage capacitor electrode layer (100a); a second step of forming a gate insulating film layer (100c) on the storage capacitor electrode layer so that the gate insulating film layer covers the storage capacitor electrode layer; and a third step of forming a drain electrode extension section layer (100d) on the gate insulating film layer so that the drain electrode extension section layer overlaps with at least a portion of the storage capacitor electrode layer, the drain electrode extension section layer (100d) being made of an oxide semiconductor which has been made conductive, at least a portion of the storage capacitor electrode layer (100a) being light-transmissive.

The above configuration makes it possible to produce the active matrix substrate (10, 10a) which is capable of exhibiting an effect of the present invention.

A liquid crystal display device in accordance with Aspect 6 of the present invention is a liquid crystal display device including the active matrix substrate (10, 10a).

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 10, 10a, 20: active matrix substrate (substrate)
1: gate wire
2: source wire
3: switching element
4, 4a, 24: drain electrode extension section (drain electrode)
5, 5a, 25: storage capacitor electrode (CS electrode)
6: storage capacitor wire
7: pixel electrode section
8: contact hole
100: various functional layers

The invention claimed is:

1. An active matrix substrate comprising:
a plurality of pixels arranged in a matrix;
a plurality of gate wires;
a plurality of source wires intersecting with the plurality of gate wires;
a switching element including (i) a gate electrode connected to a corresponding one of the plurality of gate wires and (ii) a source electrode connected to a corresponding one of the plurality of source wires;
a drain electrode extension section connected to a drain electrode of the switching element, the drain electrode extension section being made of an oxide semiconductor which has been made conductive;
a storage capacitor electrode overlapping with at least a portion of the drain electrode extension section, at least a portion of the storage capacitor electrode being light-transmissive; and
a storage capacitor wire overlapping with the drain electrode extension section in a direction orthogonal to the drain electrode extension section in a plan view, wherein
the storage capacitor electrode is positioned beneath the storage capacitor wire.

2. The active matrix substrate as set forth in claim 1, wherein the storage capacitor electrode is made of a transparent conductive film.

3. The active matrix substrate as set forth in claim 1, wherein in each of the plurality of pixels, the storage capacitor electrode extends only toward a corresponding one of the plurality of gate wires with respect to the storage capacitor wire to which the storage capacitor electrode is connected.

4. A method for producing an active matrix substrate, comprising:

a first step of forming a storage capacitor electrode layer;

a second step of forming a gate insulating film layer on the storage capacitor electrode layer so that the gate insulating film layer covers the storage capacitor electrode layer;

a third step of forming a drain electrode extension section layer on the gate insulating film layer so that the drain electrode extension section layer overlaps with at least a portion of the storage capacitor electrode layer; and a fourth step of forming a storage capacitor wire on the drain electrode extension section so that the storage capacitor wire overlaps with the drain electrode extension section in a direction orthogonal to the drain electrode extension section in a plan view, wherein the drain electrode extension section layer is made of an oxide semiconductor that is conductive, at least a portion of the storage capacitor electrode layer is light-transmissive, and the storage capacitor electrode layer is positioned beneath the storage capacitor wire.

5. A liquid crystal display device comprising an active matrix substrate recited in claim 1.

6. The active matrix substrate as set forth in claim 1, wherein the drain electrode extension section extends only toward a corresponding one of the plurality of gate wires.

7. The active matrix substrate according to claim 6, wherein the storage capacitor electrode extends only toward a corresponding one of the plurality of gate wires with respect to the storage capacitor wire to which the storage capacitor electrode is connected, and the storage capacitor wire is on the drain electrode extension section in a direction orthogonal to the drain electrode extension section and the storage capacitor electrode in the plan view.

8. The active matrix substrate as set forth in claim 1, further comprising:

a pixel electrode connected with the drain electrode extension section; and at least two insulating layers between the pixel electrode and the switching element; wherein one of the at least two insulating layers is selectively etched in a portion where the pixel electrode, the storage capacitor electrode, and the drain electrode extension section overlap with each other.

* * * * *